United States Patent

Hartweg et al.

[11] Patent Number: 5,945,080
[45] Date of Patent: *Aug. 31, 1999

[54] CATALYST AND PROCESS FOR ITS PRODUCTION

[75] Inventors: Martin Hartweg, Erbach; Martina Heinau, Ulm; Andrea Seibold, Blaustein-Arnegg; Leonhard Walz, Neu-Ulm; Thomas Fetzer, Speyer; Bernd Morsbach; Wolfgang Buechele, both of Ludwigshafen, all of Germany

[73] Assignees: Daimler-Benz AG, Stuttgart; BASF Aktiengesellschaft, Ludwigshafen, both of Germany

[*] Notice: This patent is subject to a terminal disclaimer.

[21] Appl. No.: 08/889,151

[22] Filed: Jul. 7, 1997

Related U.S. Application Data

[62] Division of application No. 08/490,933, Jun. 16, 1995, Pat. No. 5,750,460.

[30] Foreign Application Priority Data

Jun. 16, 1994 [DE] Germany .................. 44 20 932

[51] Int. Cl.⁶ .................. B01D 53/54; B01D 53/94
[52] U.S. Cl. .................. 423/239.1; 423/245.3; 423/213.2
[58] Field of Search .................. 423/235, 239.1, 423/239.2, 212, 213.2, 245.3; 502/340, 343, 344, 345, 355; 60/274, 299

[56] References Cited

U.S. PATENT DOCUMENTS

| | | | |
|---|---|---|---|
| 3,787,332 | 1/1974 | Sugier | 252/443 |
| 4,596,782 | 6/1986 | Courty et al | 502/302 |
| 4,791,141 | 12/1988 | Chaumette et al. | 518/713 |
| 5,303,547 | 4/1994 | Mieville et al. | 60/274 |
| 5,580,534 | 12/1996 | Hartweg et al. | 423/239.2 |
| 5,587,137 | 12/1996 | Swaroop et al. | 423/239.2 |

FOREIGN PATENT DOCUMENTS

| | | |
|---|---|---|
| 0 042 471 | 12/1981 | European Pat. Off. . |
| 0 395 471 | 10/1990 | European Pat. Off. . |
| 0 548 481 | 6/1993 | European Pat. Off. . |
| 2311584 | 12/1976 | France . |
| 20 10 194 | 9/1970 | Germany . |
| 43 01 470 | 7/1994 | Germany . |
| 8-38908 | 2/1996 | Japan . |
| 89/00082 | 1/1989 | WIPO ............... B01J 25/00 |

*Primary Examiner*—Ngoc-Yen Nguyen
*Assistant Examiner*—Peter DiMauro
*Attorney, Agent, or Firm*—Evenson, Mckeown, Edwards, & Lenahan, PLLC

[57] ABSTRACT

A catalyst and a process for producing the catalyst are provided. For the catalytic reduction of $NO_x$ and for the oxidation of hydrocarbons, the catalyst contains a spinel containing the metals copper, zinc and aluminum.

7 Claims, 2 Drawing Sheets

CATALYST AND PROCESS FOR ITS PRODUCTION

This is a divisional of application Ser. No. 08/490,933, filed Jun. 16, 1995, now U.S. Pat. No. 5,750,460, granted May 12, 1998.

BACKGROUND AND SUMMARY OF THE INVENTION

The invention relates to a catalyst and, more particularly, to a catalyst including a spinel containing copper (Cu), zinc (Zn), and aluminum (Al). The invention further relates to a process for the production of the catalyst and, more particularly, to the process for producing a catalyst for gases, where for producing the catalyst there is selected a spinel containing the metals copper (Cu), zinc (Zn) and aluminum (Al).

German Patent document DE 43 01 470 A1, which is not a prior publication, discloses a $CuAl_2O_4$ spinel which, with the additions of tin, lead, an element of the main or transition group II of the Periodic Table of the Elements as an oxide or salt or in elemental form and subsequent calcination, is combined to give a spinel. The previously known spinel of this type is used for the decomposition of $N_2O$. The use of this catalyst for catalytic oxidation of $CO_2$ and $NO_x$, in particular at temperatures of several 100° C., is not known.

The need to purify gases, particularly engine exhaust gases, by removing nitrogen oxides therefrom, i.e., the degradation of $NO_x$, for reasons of environmental protection is an urgent problem. Engine exhaust gases which must be purified, besides lowering the concentrations of CO, etc., are typically formed, for example, in internal combustion engines and here particularly in diesel or lean-mix engines.

EP 042 471 B1 discloses a catalyst for the catalytic oxidation of carbon monoxide (CO) to carbon dioxide ($CO_2$). The catalyst contains the metals copper (Cu), zinc (Zn) and aluminum (Al) as metal oxides. At least 60% of the Cu present is bound to the aluminum oxide as a copper oxide-aluminum oxide spinel. In the free spaces of the porous spinel, zinc oxide is present in a proportion by weight of from 1% to 20%.

However, the catalyst previously known from EP 042 471 B1 is only known to have a purifying action with respect to CO which is based on a catalytic oxidation of the CO. Whether the catalyst is likewise suitable for purifying gases containing $NO_x$ and/or hydrocarbons, as are formed, in particular, in the above-mentioned internal combustion engines and, for example, also in thermal power stations and the like, is not known.

There is therefore needed to further develop the known catalyst so that it has a good purifying action, in particular in the case of $NO_x$, together with very good stability to the constituents of waste gases. It is further needed to develop a process for producing such a catalyst.

In the case of a catalyst of this type, these needs are met according to the present invention by a catalyst including a spinel containing copper (Cu), zinc (Zn), and aluminum (Al). The catalyst used for the catalytic reduction of $NO_x$ and/or the oxidation of hydrocarbons in waste gases contains a copper oxide-zinc oxide-aluminum oxide spinel of the chemical formula $Cu_AZn_CAl_DO_4$, where: A+C+D=3 and A>0, C>0 and D>0.2. These needs are also achieved by the process for producing a catalyst for gases, where for producing the catalyst there is selected a spinel containing the metals copper (Cu), zinc (Zn) and aluminum (Al). For producing the catalyst of copper oxide and cobalt oxide and zinc oxide and aluminum oxide a spinel is prepared containing all four metals. The use of a $Cu_AZn_CAl_DO_4$ spinel as a catalyst makes the catalyst largely stable to the constituents of the waste gases such as, for example, $H_2O$, $NO_x$, $CO_2$ and/or $SO_2$. The spinel has an oxidizing effect on hydrocarbons and a catalytically reducing effect on the $NO_x$. The reduction of $NO_x$ takes place in oxygen-containing gas and in the presence of reducing agents such as, for example, the hydrocarbons mentioned above. Advantageously, hydrocarbons are present in a sufficient concentration in the exhaust gases of internal combustion engines. In favorable cases, an amount of reduction above 60% can be achieved at temperatures above 300° C.

Furthermore, the present invention will be described by means of an example, the measurements of which are presented graphically in the accompanying Figures.

Other objects, advantages and novel features of the present invention will become apparent from the following detailed description of the invention when considered in conjunction with the accompanying drawings.

DETAILED DESCRIPTION OF THE PREFERRED EMBODIMENTS

EXAMPLE 1

As a pulverulent spinel, use is made of a copper/zinc/aluminum spinel having the composition $Cu_{0.5}Zn_{0.5}Al_2O_4$. Ten grams of the spinel powder are placed in a vertically arranged quartz reactor having a diameter of about 20 mm and a height of about 500 mm. In the middle of the reactor there is arranged a gas-permeable frit for exposing the sample to gas. The bed depth is about 15 mm. Around the quartz reactor there is arranged a furnace which heats the middle part of the reactor over a length of about 100 mm, with temperatures of up to 550° C. being achievable.

A gas mixture containing 1000 ppm of NO, 1000 ppm of propene, 10% of oxygen and the remainder argon as a carrier gas is passed through the catalyst at a space velocity of about 10,000 per hour. Downstream of the reactor, the NO concentration is measured using a gas detector, with any $NO_2$ formed being reduced to nitric oxide NO in a converter prior to detection. Simultaneously, oxidation of hydrocarbons to $C_2$ is observed by measurement of the $CO_2$ content using the gas detector.

Figure 1:
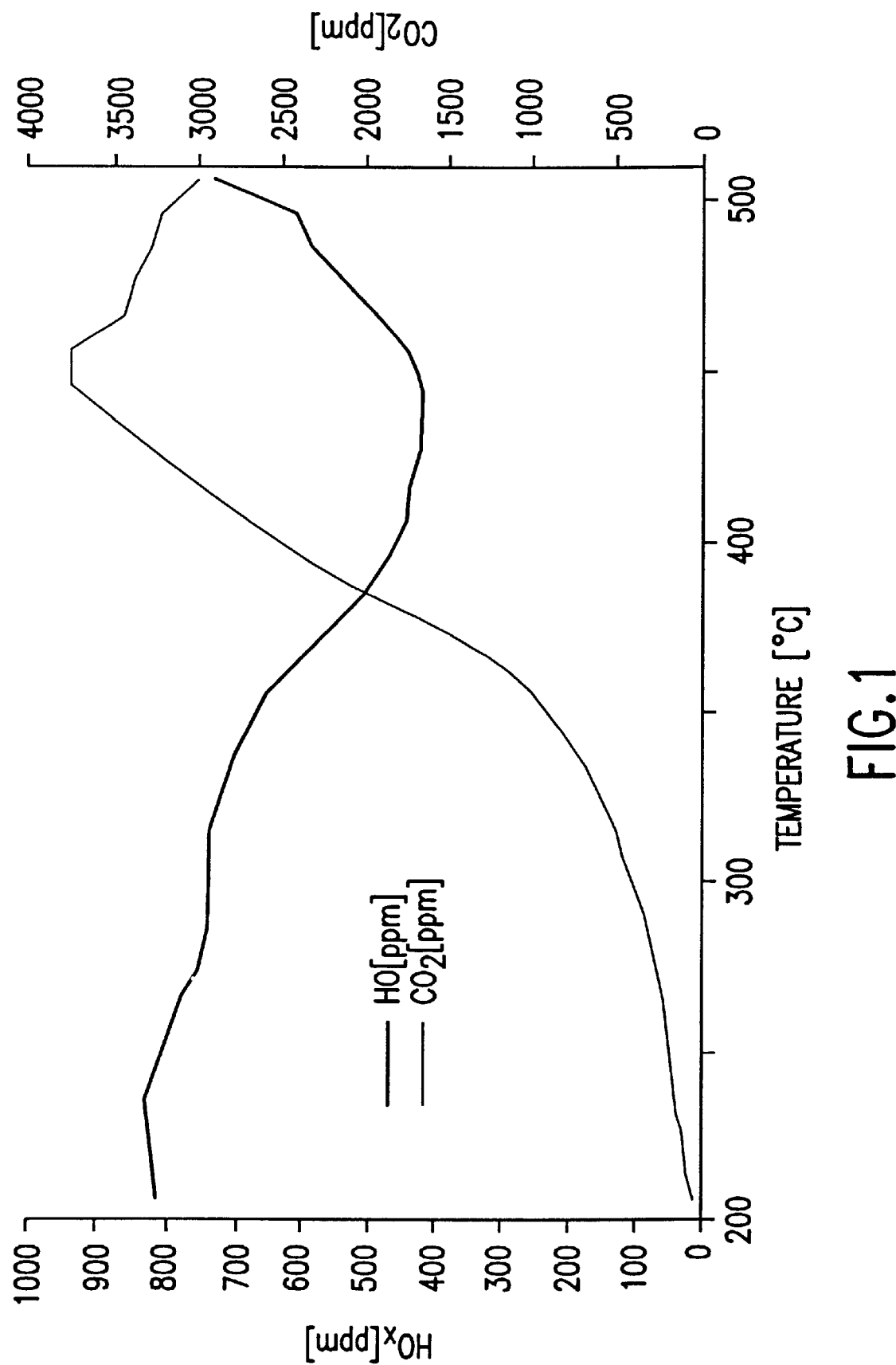
FIG. 1 is a graph of an $NO_x$ (NO) reduction versus temperature for a catalyst containing $Cu_{0.5}Zn_{0.5}Al_2O_4$.

The result of the measurement is shown graphically in FIG. 1. The NO and $CO_2$ concentrations in ppm are plotted as a function of temperature, with the $NO_x$ concentration and the $CO_2$ concentration being denoted differently. In the graph, a significant decrease in the $NO_x$ (NO) concentration with increasing temperature can be seen, the concentration reaching a minimum at about 430° C. and subsequently rising again. For the $Cu_{0.5}Zn_{0.5}Al_2O_4$, a drastic decrease in the $NO_x$ concentration is observed above about 200° C., with the hydrocarbons being converted to $CO_2$ at the same time, as is shown by the increase in the $CO_2$ concentration. The temperature window in which reduction of the $NO_x$ occurs is, depending on the composition of the material, between 200° C. and 500° C.

It is favorable that the indicated temperature range lies at about those temperatures which can occur in the waste gas stream of an exhaust of an internal combustion engine.

Further studies on this catalyst resulted in a high resistance to $NO_x$, $H_2O$, $CO_2$ and $SO_2$.

EXAMPLE 2

As a pulverulent spinel, use is made of a copper/cobalt/zinc/aluminum spinel having the composition $Cu_{0.25}Co_{0.25}Zn_{0.5}Al_2O_4$. This spinel is prepared by starting with a $Cu_{0.5}Zn_{0.5}Al_2O_4$ spinel and partially replacing the copper of the spinel by Co until Cu and Co are present in the spinel in approximately equal amounts.

Ten grams of the spinel powder are placed in a vertically arranged quartz reactor having a diameter of about 20 mm and a height of about 500 mm. In the middle of the reactor there is arranged a gas-permeable frit for exposing the sample to gas. The bed depth is about 15 mm. Around the quartz reactor there is arranged a furnace which heats the middle part of the reactor over a length of about 100 mm, with temperatures of up to 550° C. being achievable.

A gas mixture containing 1000 ppm of NO, 1000 ppm of propene, 10% of oxygen and the remainder argon as a carrier gas is passed through the catalyst at a space velocity of about 10,000 per hour.

Downstream of the reactor, the NO concentration is measured using a gas detector, with any $NO_2$ formed being reduced to nitric oxide NO in a converter prior to detection. Simultaneously, oxidation of hydrocarbons to $CO_2$ is observed by measurement of the $CO_2$ content using the gas detector.

Figure 2:
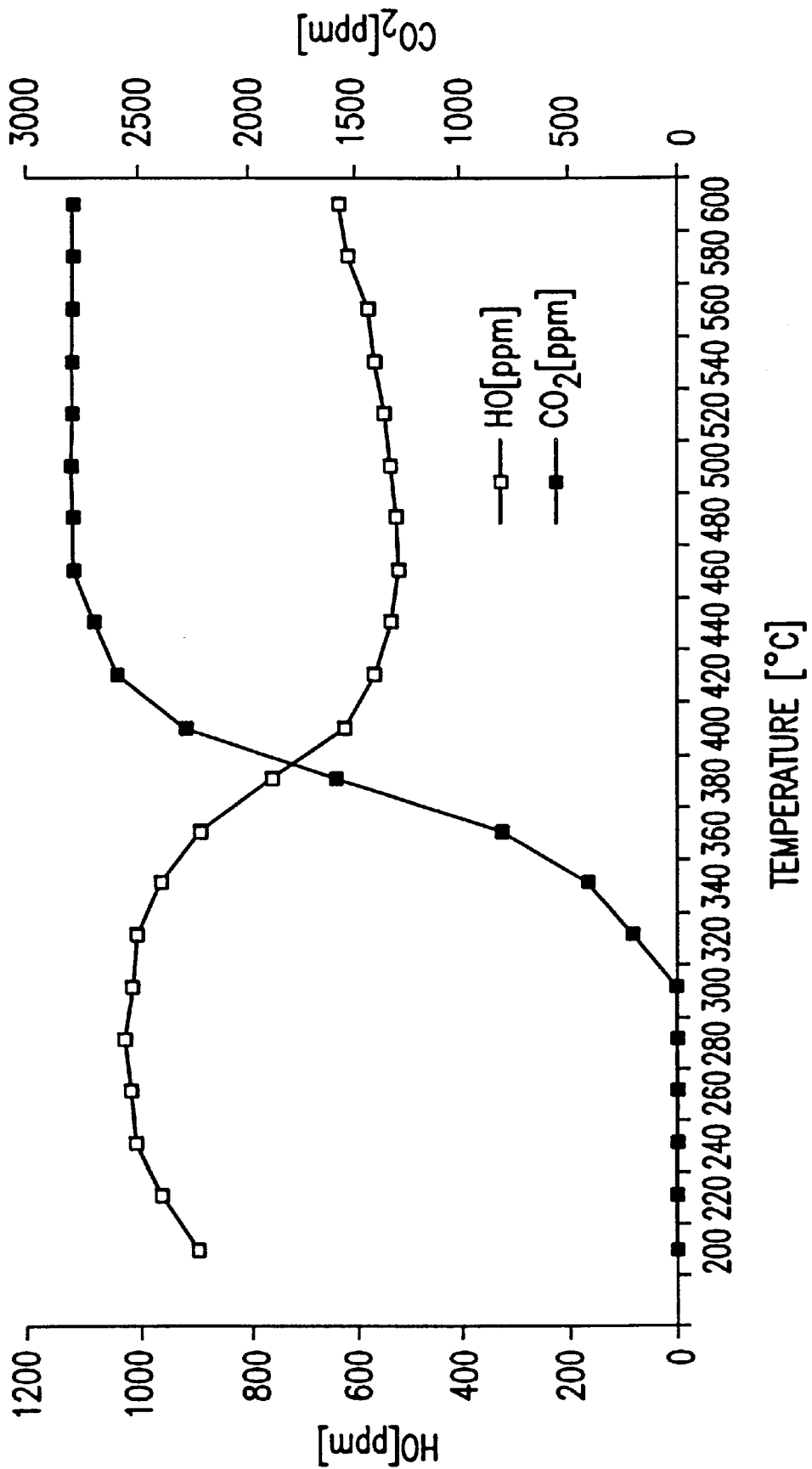
FIG. 2 is a graph of an $NO_x$ (NO) reduction versus temperature for a catalyst containing $Cu_{0.25}Co_{0.25}Zn_{0.5}Al_2O_4$.

The result of the measurement is shown graphically in FIG. 2. The $NO_x$ (NO) and $CO_2$ concentrations in ppm are plotted as a function of temperature, with the $NO_x$ concentration and the $CO_2$ concentration being denoted differently.

In the graph, a significant decrease in the $NO_x$ (NO) concentration with increasing temperature can be seen, the concentration reaching a minimum at about 460° C. and subsequently rising again.

For the $Cu_{0.25}Co_{0.25}Zn_{0.5}Al_2O_4$, a drastic decrease in the $NO_x$ concentration is observed above about 200° C., with the hydrocarbons being converted to $CO_2$ at the same time, as is shown by the increase in the $CO_2$ concentration. The temperature window in which reduction of the $NO_x$ occurs is, depending on the composition of the material, between 200° C. and 500° C.

It is favorable that the indicated temperature range lies at about those temperatures which can occur in the waste gas stream of an exhaust of an internal combustion engine.

Here also, further studies on this catalyst resulted in a high resistance to $NO_x$, $H_2O$, $CO_2$ and $SO_2$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A process for at least one of the catalytic reduction of $NO_x$ and the oxidation of hydrocarbons in waste gases comprising the step of contacting the waste gas with a catalyst comprising a copper oxide, zinc oxide, aluminum oxide spinel of the chemical formula $Cu_A Zn_C Al_D O_4$, where: A+C+D=3 and A>0, C>0 and D>0.

2. The process according to claim 1, wherein the catalyst comprises a copper oxide, zinc oxide, aluminum oxide spinel of the chemical formula $$Cu_{(1-C)}Zn_C Al_2 O_4,$$

where: 0<C<1.

3. The process according to claim 1, wherein the catalyst comprises a copper oxide, zinc oxide, aluminum oxide spinel of the chemical formula $$Cu_{0.5}Zn_{0.5}Al_2 O_4.$$

4. A process for at least one of the catalytic reduction of $NO_x$ and the oxidation of hydrocarbons in waste gases comprising the step of contacting the waste gas with a catalyst comprising a copper oxide cobalt oxide, zinc oxide, aluminum oxide spinel of the chemical formula $$Cu_A Co_B Zn_C Al_D O_4,$$

where: A+B+C+D=3 with A>0, B>0, C>0 and D>0.

5. The process according to claim 4, wherein the spinel is a copper oxide, cobalt oxide, zinc oxide, aluminum oxide spinel of the chemical formula $$Cu_{(1-(B+C))}Co_B Zn_C Al_2 O_4,$$

where: 0<(B+C)<1 with B>0 and C>0.

6. The process according to claim 4, wherein the spinel is a copper oxide, cobalt oxide, zinc oxide, aluminum oxide spinel of the chemical formula $$Cu_{(0.5-B)}, Co_B Zn_{0.5} Al_2 O_4,$$

where: 0<B<0.5.

7. The process according to claim 4, wherein the spinel is a copper oxide, cobalt oxide, zinc oxide, aluminum oxide spinel of the chemical formula $$Cu_{0.25}Co_{0.25}Zn_{0.5}Al_2 O_4.$$

* * * * *